(12) United States Patent
Mitsuoka et al.

(10) Patent No.: US 7,350,285 B2
(45) Date of Patent: Apr. 1, 2008

(54) METHOD OF MANUFACTURING A SWITCH PANEL TO BE DISPOSED CLOSE TO A MAGNETIC SENSOR

(75) Inventors: Hideki Mitsuoka, Okayama (JP); Hiromichi Koyama, Okayama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/591,578

(22) Filed: Nov. 2, 2006

(65) Prior Publication Data

US 2007/0050972 A1 Mar. 8, 2007

Related U.S. Application Data

(62) Division of application No. 11/252,617, filed on Oct. 19, 2005, now Pat. No. 7,178,223.

(30) Foreign Application Priority Data

Oct. 20, 2004 (JP) .............................. 2004-305474

(51) Int. Cl.
*H01H 11/00* (2006.01)
*H01H 65/00* (2006.01)

(52) U.S. Cl. .............................. 29/622; 29/412; 29/825; 29/832; 29/842; 29/846; 29/874; 200/11 R; 200/61.45 M; 200/406; 200/516; 324/207.2; 335/170; 335/192

(58) Field of Classification Search .................. 29/622, 29/412, 825, 832, 842, 846, 874; 200/11 R, 200/61.45 M, 406, 516; 324/207.2; 335/170, 335/192; 379/433.03; 455/575.3
See application file for complete search history.

(56) References Cited

U.S. PATENT DOCUMENTS

| | | | |
|---|---|---|---|
| 5,924,555 A | * | 7/1999 | Sadamori et al. ........... 200/512 |
| 6,604,278 B2 | * | 8/2003 | Sera et al. ................. 29/622 |
| 6,767,655 B2 | | 7/2004 | Hiramoto et al. |
| 6,922,573 B2 | | 7/2005 | Hijii |

FOREIGN PATENT DOCUMENTS

| | | |
|---|---|---|
| JP | 4-239105 | 8/1992 |
| JP | 2002-204010 | 7/2002 |
| JP | 2002-261897 | 9/2002 |
| JP | 2003-077368 | 3/2003 |
| JP | 2003-257282 | 9/2003 |

* cited by examiner

*Primary Examiner*—Tim Phan
(74) *Attorney, Agent, or Firm*—Wenderoth, Lind & Ponack, L.L.P.

(57) ABSTRACT

A method of manufacturing a movable contact unit includes manufacturing a movable contact, sticking the movable contact to a base sheet made of insulating resin, and applying demagnetization to the movable contact so that the residual magnetic flux density is smaller than the operation magnetic flux density of the magnetic sensor. In manufacturing the movable contact, elastic metal plate material is processed into a downwardly opening dome shape to form the movable contact. In a method of manufacturing a switch panel, the movable contact unit is overlaid on a wiring board having a contact, including pair an outer fixed contact and a central fixed contact, that corresponds to the movable contact so that the lower end of the outer periphery of the movable contact is mounted on the outer fixed contact.

11 Claims, 3 Drawing Sheets

METHOD OF MANUFACTURING A SWITCH PANEL TO BE DISPOSED CLOSE TO A MAGNETIC SENSOR

This application is a divisional application of application Ser. No. 11/252,617, filed Oct. 19, 2005, now U.S. Pat No. 7,178,223.

CROSS REFERENCE TO RELATED DOCUMENTS

This application claims priority to the Japanese Patent Application No. 2004-305474, filed on Oct. 20, 2004.

BACKGROUND OF THE INVENTION

1. Field of the Invention

The present invention relates to a movable contact unit used in operation units of various electronic apparatuses, a method of manufacturing the movable contact unit, and a method of manufacturing a switch panel.

2. Background Art

Recently, various electronic apparatuses such as portable phones or personal digital assistants (PDAs) have been remarkably downsized and have had many functions. As an operation unit of each of the electronic apparatuses, a switch panel formed by disposing a plurality of pressing switches arranged in a predetermined array is used.

A conventional movable contact unit used for forming such a switch panel and an electronic apparatus mounted with the switch panel using the movable contact unit are described with reference to FIG. 4 to FIG. 6.

FIG. 4 is a sectional view of the conventional movable contact unit, and FIG. 5 is an exploded perspective view thereof. Movable contact 1 made of an elastic thin metal sheet has a dome shape having a downward opening. Base sheet 2 is made of an insulating resin film, and has adhesive layer 2A on its lower surface. A plurality of movable contacts 1 are disposed in a predetermined array on the lower surface of base sheet 2, and the upper surface of each movable contact 1 is stuck and held by adhesive layer 2A. Thus, movable contact unit 3 capable of forming a plurality of pressing switches is formed.

FIG. 6 is a sectional view of an essential part of an electronic apparatus mounted with the switch panel formed using the conventional movable contact unit. A plurality of pairs, each of which includes central fixed contact 5A and outer fixed contact 5B that correspond to respective movable contact 1, are disposed on the upper surface of planar wiring board 4 at positions corresponding to respective movable contacts 1. An electrode for connection to another circuit is led from each fixed contact, although they are not illustrated.

The lower end of the outer periphery of each movable contact 1 is mounted on each corresponding outer fixed contact 5B. The lower surface of the top of the dome shape faces each corresponding central fixed contact 5A. Movable contact unit 3 is overlaid on wiring board 4 with reference to small holes 4A for positioning that are disposed at ends and small holes 2B of base sheet 2. Movable contact unit 3 is stuck onto wiring board 4 through exposed adhesive layer 2A of base sheet 2. Thus, switch panel 7 having a plurality of arranged press switches is formed.

Switch panel 7 is positioned in exterior case 8 of an electronic apparatus. Each operation button 9 is disposed at a position corresponding to each movable contact 1 of switch panel 7. Operation button 9 vertically movably projects from a button hole in exterior case 8 and is an operation portion that can be pressed from the outside.

An operation of such an operation unit of the electronic apparatus is described briefly. Firstly, operation button 9 is pressed down to press the upper surface of the top of movable contact 1 with operation button 9. Then, movable contact 1 is elastically inverted while providing a click feeling. When the lower surface of the top makes contact with central fixed contact 5A, central fixed contact 5A is electrically connected to outer fixed contact 5B via movable contact 1. The press switch is thus turned on.

When the pressing force to operation button 9 is released, the lower surface of the top is separated from central fixed contact 5A by the elastic restoring force of movable contact 1, and operation button 9 is pressed back. The press switch is thus returned to the OFF state shown in FIG. 6. Such a panel switch is disclosed in Japanese Patent Unexamined Publication No. 2003-077368, for example.

As the material of movable contact 1, a thin stainless-steel sheet is often used. However, such a material can be magnetized due to its handling or the like. This magnetization can affect the operation of a magnetic sensor that is mounted on a portable phone or the like and used for determination of a folded (closed) state or unfolded (open) state of the portable phone or azimuth identification. Therefore, when the integration density of components is increased in an apparatus, consideration of the effect of the magnetization of movable contact 1 is required.

SUMMARY OF THE INVENTION

A method manufacturing of a movable contact of the present invention includes:

(A) manufacturing a movable contact;

(B) sticking the movable contact to a base sheet made of insulating resin; and (C) applying demagnetization to the movable contact.

In step A, elastic metal plate material is processed into a downwardly opening dome shape to form the movable contact. In step C, the demagnetization is performed so that the residual magnetic flux density of the movable contact is smaller than the operation magnetic flux density of a magnetic sensor that is disposed near it. In the movable contact unit manufactured in such a manner, the demagnetization is performed until the residual magnetic flux density of the movable contact is smaller than the operation magnetic flux density of the magnetic sensor that is disposed near it, so that click operation feeling is obtained without producing an adverse effect of magnetism on the electronic apparatus. In the manufacturing method of a switch panel of the present invention, the movable contact unit is overlaid on a wiring board having a pair of an outer fixed contact and a central fixed contact that correspond to the movable contact so that the lower end of the outer periphery of the movable contact is mounted on the outer fixed contact. The movable contact included in the switch panel manufactured in such a manner is demagnetized. When the switch panel is mounted to an apparatus, an effect to a magnetic sensor or the like disposed for the other function have to be little considered. Therefore, the switch panel and the magnetic sensor can be disposed close to each other, and downsizing and thinning of the apparatus can be achieved.

DETAILED DESCRIPTION OF THE INVENTION

Figure 1:
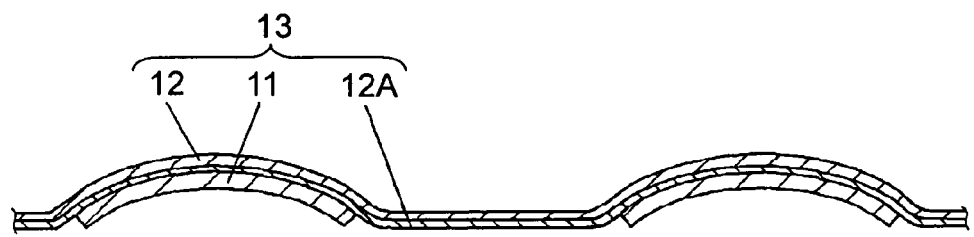
FIG. 1 is a sectional view of a movable contact unit in accordance with an exemplary embodiment of the present invention.
Figure 2:
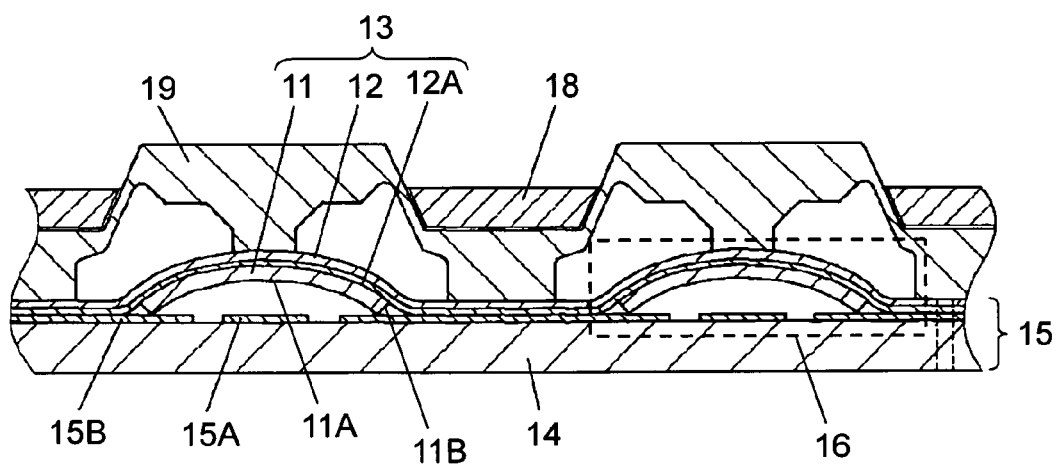
FIG. 2 is a sectional view of an essential part of an electronic apparatus having a switch panel using the movable contact unit of FIG. 1.

FIG. 1 is a sectional view of a movable contact unit in accordance with an exemplary embodiment of the present invention. FIG. 2 is a sectional view of an essential part of an electronic apparatus having a switch panel using the movable contact unit of FIG. 1.

Flexible and electrically insulating base sheet 12 is processed so that the outer shape is constant. Adhesive layer 12A is disposed on the whole lower surface. Each of movable contacts 11 is formed in downwardly opening dome shape. The upper surface of each movable contact 11 is stuck and held independently by adhesive layer 12A. Movable contact unit 13 is thus configured. Movable contact 11 is formed in the downwardly opening dome shape by drawing of a thin elastic metal sheet, and undergoes demagnetization. For the material of the thin elastic metal sheet, austenitic stainless steel is preferable from the viewpoint of the spring characteristic. SUS 301 containing 17 wt % of chrome and 7 wt % of nickel has a good spring characteristic, so that the SUS 301 is preferable as the material of movable contact 11. Adhesive layer 12A is made of an acrylic adhesive, and base sheet 12 is made of polyethylene terephthalate having a thickness of about 50 μm, for example.

Next, the method of manufacturing movable contact unit 13 is briefly described. Each of movable contacts 11 is formed in the downwardly opening dome shape by drawing a thin sheet made of austenitic stainless steel. At this time, a plurality of dome shapes may be formed on the thin sheet and then the thin sheet may be cut into individual pieces, or individual material pieces may be molded in the dome shapes. Movable contacts 11 are then demagnetized. Then, movable contacts 11 are stuck to base sheet 12 through adhesive layer 12A. Movable contact unit 13 is thus formed.

A separator (not shown) for protecting the lower surfaces of movable contacts 11 is stuck to the lower surface of base sheet 12 having movable contacts 11. The separator is stuck to the lower surface of base sheet 12 through adhesive layer 12A so as to sandwich movable contacts 11 with base sheet 12. When movable contact unit 13 is used, the separator is removed.

A method may be employed where movable contact unit 13 is formed without applying the demagnetization to movable contacts 11 as discussed above and the demagnetization is subsequently applied to the whole movable contact unit 13. Only movable contacts 11 of the components of movable contact unit 13 are easily magnetized, so that only movable contacts 11 are demagnetized also in this case. In this case, movable contact unit 13, which is larger than movable contact 11 is handled, so that workability is improved. On the other hand, when individual movable contacts 11 are demagnetized, the demagnetization is reliably performed.

The method of demagnetizing movable contacts 11 is not especially limited. As in a general demagnetizing method disclosed in Japanese Patent Unexamined Publication No. H4-239105, for example, an alternating magnetic field is applied to movable contacts 11 or movable contact unit 13 as the object, and the magnetic flux density of the magnetic field applied to the object is gradually attenuated. The magnetizing force of the object is thus reduced to perform the demagnetization.

As shown in FIG. 2, switch panel 15 has movable contact unit 13 and wiring board 14. Central fixed contacts (hereinafter referred to as "contacts") 15A and outer fixed contacts (hereinafter referred to as "contacts") 15B are disposed on wiring board 14. Movable contact unit 13 is stuck to wiring board 14 through adhesive layer 12A of base sheet 12 that is exposed by removing the separator so that each of movable contacts 11 corresponds to a pair of contacts 15A and 15B.

In other words, the lower surface of dome-like top 11A of each movable contact 11 faces each corresponding contact 15A. The lower end of outer periphery 11B of each movable contact 11 is mounted on each corresponding contact 15B. Adhesive layer 12A of the peripheral part is stuck on the upper surface of wiring board 14. Thus, each press switch 16 is formed.

Switch panel 15 having a plurality of press switches 16 is positioned in exterior case 18 of the apparatus. Operation buttons 19 are vertically movably combined correspondingly to the positions of movable contacts 11 of respective press switches 16. An operation unit that can be operated from the outside is thus configured.

Contacts 15A and 15B are print patterns of copper or the like disposed on wiring board 14, and operation button 19 is a molded resin body. Especially, when operation buttons 19 are unitarily formed as shown in FIG. 2, it is preferable to form operation buttons 19 of silicon resin or the like having flexibility. In this case, each operation button 19 is a thick part disposed at a predetermined position of a silicon resin sheet.

Next, an operation of such an operation unit of the electronic apparatus is briefly described. Operation button 19 is pressed down to press the upper surface of top 11A of movable contact 11. Then, movable contact 11 is elastically inverted while providing a click feeling. Therefore, contact 15A is electrically connected to contact 15B via movable contact 11, and press switch 16 is turned on.

When the pressing force to operation button 19 is released, movable contact 11 returns to the original dome shape due to its own elastic restoring force. Movable contact 11 presses back operation button 19, and the lower surface of top 11A is separated from contact 15A. Press switch 16 thus returns to the OFF state shown in FIG. 2.

Figure 3:
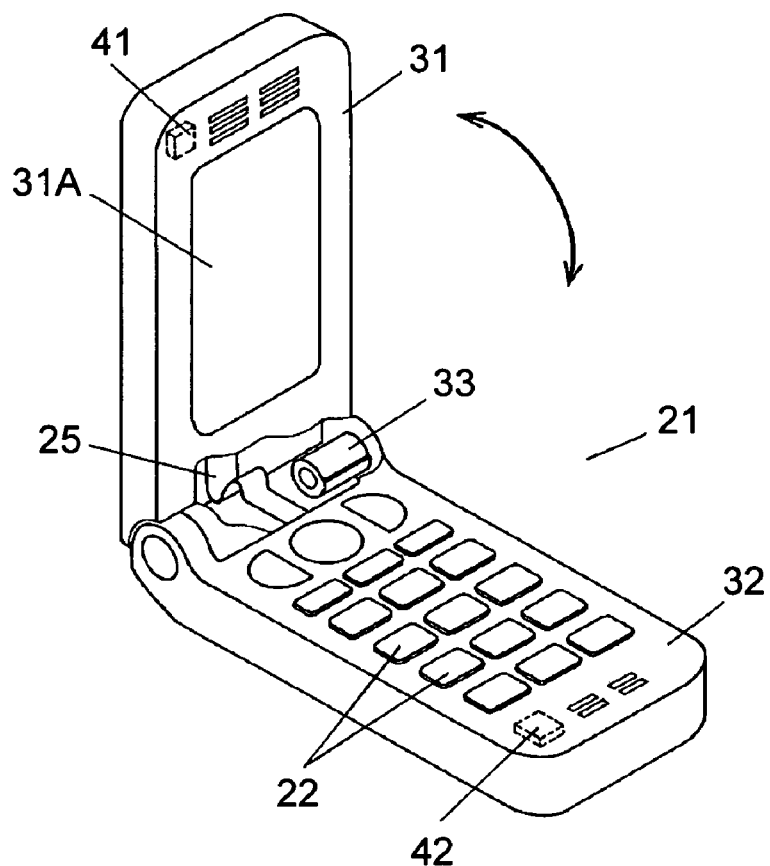
FIG. 3 is an external perspective view of a folding type portable phone as the electronic apparatus of FIG. 2.
Figure 4:
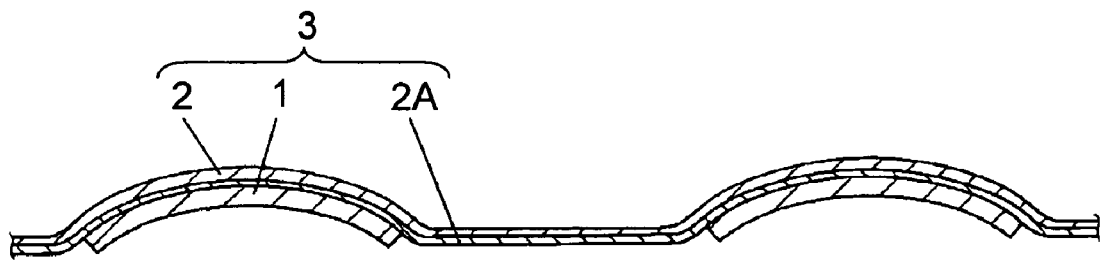
FIG. 4 is a sectional view of a conventional movable contact unit.
Figure 5:
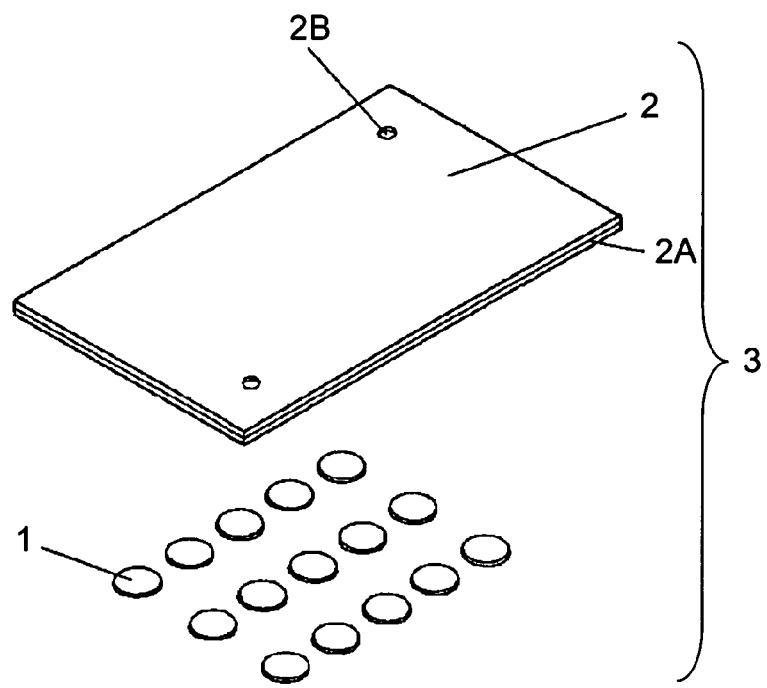
FIG. 5 is an exploded perspective view of the movable contact unit of FIG. 4.
Figure 6:
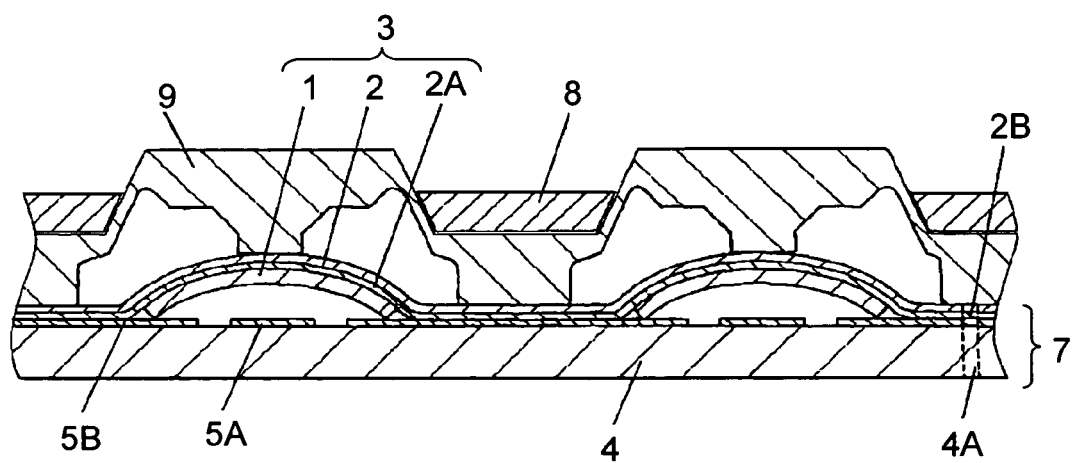
FIG. 6 is a sectional view of an essential part of an electronic apparatus having a switch panel using the movable contact unit of FIG. 4.

Switch panel 15 is mounted as numeric keypad unit 22 or the like such as a keypad unit of folding-type portable phone 21, as shown in the perspective view of FIG. 3, for example. In this case, movable contact 11 has a diameter of 4 to 5 mm, and the dome height is about 0.2 to 0.3 mm. In this application, movable contact 11 is required to endure 500,000 to 3,000,000 operations, namely to have durable reliability for use in on/off operations. Therefore, as discussed above, SUS 301 having a good spring characteristic is often used as the material of movable contact 11.

In the present embodiment, movable contact 11 made of austenitic stainless steel that is easily magnetized by machining is demagnetized. In some cases, a method may be employed where switch panel 15 is assembled as discussed above without applying the demagnetization to movable contacts 11 and the demagnetization is subsequently applied to the whole switch panel 15.

In FIG. 3, portable phone 21 has first casing (hereinafter referred to as "casing") 31 and second casing (hereinafter referred to as "casing") 32. Casing 31 has display unit 31A made of liquid crystal or the like. Casing 32 has numeric keypad unit 22. In other words, wiring board 14 of FIG. 2 is stored in casing 32. Hinge 33 interconnects casing 31 and casing 32 in a manner so that they can be folded and unfolded. In the folded state, display unit 31A and numeric keypad unit 22 are stored on the inner surface side. Display unit 31A or the like is connected to wiring board 14 stored in casing 32 through flexible wiring board 25.

When portable phone 21 is used, the user unfolds casings 31 and 32 from the folded state by a predetermined angle, presses numeric keypad unit 22, and makes a call or transmits or receives an e-mail.

The folded state of casing 31 and casing 32 is a non-operation state, so that the folded state is detected and portable phone 21 often undergoes a switching to power saving mode. An example of configurations for detecting the state is a combination of magnetism generating element (hereinafter referred to as "element") 41 and magnetic sensor (hereinafter referred to as "sensor") 42. Element 41 is disposed at an end position opposite to the side where hinge 33 of casing 31 is disposed. Sensor 42 is disposed in casing 32, and is disposed at a position where sensor 42 faces element 41 in the folded state of casing 31 and casing 32. In this configuration, in the folded state of casing 31 and casing 32, sensor 42 detects the magnetism from element 41 and outputs a predetermined electric signal. Portable phone 21 enters the power saving mode based on the electric signal. Element 41 can be made of a general electromagnet or a permanent magnet, and sensor 42 can be made of a hall integrated circuit (IC) or a thin magnetic magneto-resistive element, for example. The hall IC is disclosed in Japanese Patent Unexamined Publication No. 2002-261897, and the thin magnetic magneto-resistive element is disclosed in Japanese Patent Unexamined Publication No. 2002-204010, for example. For downsizing the apparatus, the hall IC is preferable.

Numeric keypad unit 22 is often used on substantially the whole upper surface of casing 32, and the layout region of numeric keypad unit 22 can be close to the layout place of sensor 42. Movable contact 11 forming each press switch of numeric keypad unit 22 is demagnetized, so that the causes of detection errors or the like of sensor 42 are decreased. Undesired magnetism from movable contact 11 disposed closely to sensor 42 is eliminated, so that sensitivity of sensor 42 can be increased. The residual magnetic flux density of movable contact 11 is smaller than the operation magnetic flux density (sensitivity) of sensor 42, and preferably is smaller than substantially half the operation magnetic flux density by demagnetization. When a hall IC having about 6 mT of operation magnetic flux density (sensitivity) is employed, for example, it is preferable to demagnetize movable contacts 11 so that the sum of the residual magnetic flux densities of a plurality of movable contacts 11 disposed closely to the hall IC is 5 mT or lower, and more preferably 3 mT or lower.

In the present embodiment, each movable contact 11 of movable contact unit 13 forming a component of the operation unit is demagnetized. Therefore, a thin and light operation unit capable of providing a click feeling in an operation can be configured, and an effect on magnetic sensor 42 or the like provided for another function requires little consideration. Movable contact 11 and sensor 42 can therefore be disposed close to each other, so that the apparatus can be thinned and downsized.

In an electronic apparatus having a movable contact unit of the present invention, a switch panel using the movable contact unit, or a switch panel manufactured by a method of manufacturing the present invention, the effect of magnetism from the movable contact unit to the electronic apparatus is reduced. The method of manufacturing the movable contact unit is useful in forming various electronic apparatuses.

What is claimed is:

1. A method of manufacturing a switch panel to be disposed close to a magnetic sensor, said method comprising:
   assembling a movable contact unit by:
      manufacturing a movable contact by processing elastic metal plate material into a downwardly opening dome shape,
      sticking the movable contact to a base sheet made of insulating resin, and
      demagnetizing the movable contact to reduce a residual magnetic flux density thereof, to thereby cause the residual magnetic flux density of the movable contact to be smaller than an operation magnetic flux density of the magnetic sensor; and
   overlaying the movable contact unit on a wiring board having a pair of an outer fixed contact and a central fixed contact that corresponds to the movable contact so that the lower end of the outer periphery of the movable contact is mounted on the outer fixed contact.

2. The manufacturing method according to claim 1, wherein
   said demagnetizing of the movable contact is carried out prior to said sticking of the movable contact to the base sheet.

3. The manufacturing method according to claim 2, wherein
   said demagnetizing of the movable contact comprises applying an alternating magnetic field to the movable contact.

4. The manufacturing method according to claim 3, wherein said demagnetizing of the movable contact further comprises gradually attenuating a magnetic flux density of the alternating magnetic field as the alternating magnetic field is being applied to the movable contact.

5. The manufacturing method according to claim 1, wherein
   said demagnetizing of the movable contact is carried out after said sticking of the movable contact to the base sheet.

6. The manufacturing method according to claim 5, wherein
   said demagnetizing of the movable contact comprises applying an alternating magnetic field to the movable contact.

7. The manufacturing method according to claim 6, wherein
   said demagnetizing of the movable contact further comprises gradually attenuating a magnetic flux density of the alternating magnetic field as the alternating magnetic field is being applied to the movable contact.

8. The manufacturing method according to claim 1, wherein said demagnetizing of the movable contact comprises applying an alternating magnetic field to the movable contact.

9. The manufacturing method according to claim 8, wherein said demagnetizing of the movable contact further comprises gradually attenuating a magnetic flux density of the alternating magnetic field as the alternating magnetic field is being applied to the movable contact.

10. The manufacturing method according to claim 1, wherein the elastic metal plate material is austenitic stainless steel.

11. The manufacturing method of claim 10, wherein the austenitic stainless steel contains 17 wt % of chrome and 7 wt % of nickel.

* * * * *